United States Patent [19]

Ransom

[11] 4,455,915

[45] Jun. 26, 1984

[54] CARTRIDGE HOPPER FOR LOADING MACHINE

[76] Inventor: Charles R. Ransom, P.O. Box 308, Highland, Calif. 92346

[21] Appl. No.: 365,176

[22] Filed: Apr. 5, 1982

[51] Int. Cl.³ .............................................. F42B 33/00
[52] U.S. Cl. ........................................... 86/46; 86/26; 86/45
[58] Field of Search ............... 86/26, 46, 45; 221/155, 221/172, 278, 307, 310

[56] References Cited

U.S. PATENT DOCUMENTS

| | | | |
|---|---|---|---|
| 2,623,803 | 12/1952 | Gamble | 86/46 |
| 4,020,974 | 5/1977 | Bauer et al. | 221/307 |
| 4,158,321 | 6/1979 | Meacham | 86/45 |

Primary Examiner—Stephen J. Lechert, Jr.
Assistant Examiner—Joel P. Okamoto
Attorney, Agent, or Firm—Evanns & Walsh

[57] ABSTRACT

A feed hopper for shell casings for use with a cartridge loading machine. The hopper is in the form of a container having curving interior surfaces, the surfaces extending to a feed aperture at the bottom of the hopper connected to a feed tube. Preferably the hopper is of hemispherical shape. The hopper has a transverse member positioned diametrically across it over the aperture to prevent a casing from being dropped into it so that it could fall into the feed tube with its open end down. The configuration of the hopper causes the casings to feed steadily with the rim down into the aperture and the feed tube.

6 Claims, 3 Drawing Figures

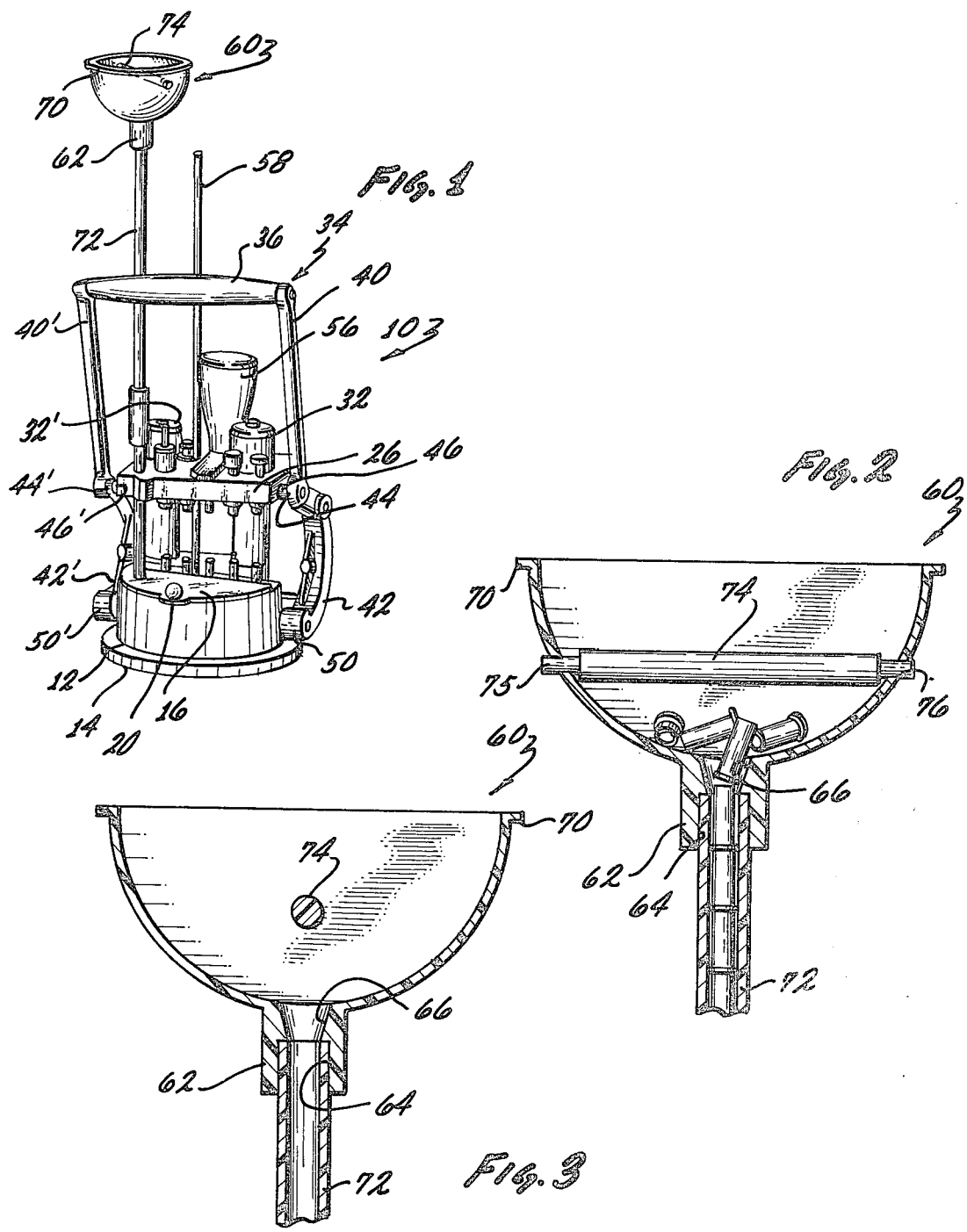

CARTRIDGE HOPPER FOR LOADING MACHINE

BACKGROUND OF THE INVENTION

1. Field of the Invention

The invention relates to a cartridge loading machine of the progressive type and more especially to an improved casing hopper from which cartridge casings are fed to the machine to be reloaded.

2. Background of the Invention

Progressive cartridge reloading machines are well known in the art, these reloaders primarily being for a limited segment of the overall market being limited particularly to small commercial reloading operations, competitive hand gun shooters and law enforcement agencies. Although this market is smaller, there is steadily growing competition. Any reloading machine expecting to meet the competition must be efficient, accurate, durable, dependable and cost effective.

Typically a cartridge loading machine includes a powder hopper for feeding powder to cartridges being loaded; feeding means for feeding new primers to be inserted in the cartridges being reloaded; and a hopper for feeding the empty cartridges themselves to the loading machine.

U.S. Pat. No. 4,020,737 is directed to a loading machine, the patentee in this patent being the inventor herein.

It has been known in connection with loading machines to provide a feed hopper for the empty shell casings. It is necessary to provide for a steady feed of shell casings with casings being fed through a tube with the open end of the casings up. The rim end of the casing is, of course, heavier so that the center of gravity of the casing is closer to the rim end than the open end.

An example of a casing feed hopper for a shell reloader is disclosed in U.S. Pat. No. 4,158,321, the mechanism of this patent including means for agitating the feed hopper.

Room has been left for improvement in the capabilities and operation of feed hoppers for casings as known in the art. It is, of course, necessary and desireable that the casings feed steadily and always with the rim end of the casing down and the open end of the feed tube up. The realization of these capabilities efficaciously has appeared as a lack in known prior art constructions. Particularly, also known casing feed hoppers have required the application of agitation in order to make them effective and this requirement or necessity has appeared as a deficiency in such casing feed hoppers.

The herein invention, a preferred embodiment of which is described in detail hereinafter is intended to realize improvements over coming the deficiencies and lack of desired capabilities in known casing feed hopper.

SUMMARY OF THE INVENTION

The cartridge case feed hopper as described in detail herein was developed particularly for a cartridge loading machine as shown in U.S. Pat. No. 4,020,737. It is, however, adapted for use with other cartridge loading machines.

The cartridge cases to be reloaded are fed through a loading tube to the loading machine itself wherein the reloading takes place in progressive steps which include the removal of the old primer, the insertion of a new primer, loading of the powder and insertion of the bullet or the projectile itself. The cartridge cases move down through the feed tube with the rim end of the cartridge case in a downward position and the open end of the cartridge case in an upward position. The rim end of a cartridge case is heavier than the open end so that the center of gravity of the casing is closer to the rim end. Utilization is made of this circumstance in order to cause the cartridge cases to drop into the feed tube from the hopper with the rim end down.

The feed of the herein invention is of a particular design and configuration whereby the desired feed of the cases is achieved. In the preferred form of the invention the hopper itself is essentially of a hemispherical shape with an aperture at the bottom aligned with the axis of the hopper itself through which the cartridge cases feed into the feed tube. That is, the hopper is of a rounded configuration and is preferably symmetrical about a central axis and in the preferred form of the invention as stated the shape is hemispherical. At the bottom of the hopper there is provided a nipple having a bore with a tapered counter bore at the upper end which forms the aperture for receiving the cartridge casings, the feed tube being attached to the nipple.

The rounded configuration extends to the tapered counter bore, this construction having been found to have the desired capability of causing the cartridge cases to drop into the aperture and into the feed tube.

The hopper may preferably be constructed of a plastic which is transparent to enable the operator to see or view the casing in the hopper as they are being fed into the feed tube. The hopper includes a transverse bar positioned horizontally over the entrance to the feed tube and above it. The cartridge cases can be just dropped into the hopper by hand and this bar serves an important purpose in that being directly over the feed aperture it prevents a casing from being dropped in such a way that it could enter the feed aperture with its open end down.

In the light of the foregoing, a primary object of the invention is to realize a cartridge case feed hopper for use with cartridge loading machines having the capability that cartridge cases placed in the hopper will continuously feed into a feed tube with the rim end of each casing in a downward position in the feed tube.

A further object is to realize a feed hopper as in the foregoing wherein the hopper has side walls of rounded or curved configuration and preferably of hemispherical shape the curvature extending to a feed aperture at the bottom of the hopper aligned with the axis of the feed tube.

Another object is to realize a feed hopper as in the foregoing wherein the hopper includes a transverse bar member positioned in the hopper directly over the feed aperture to prevent a cartridge casing from being dropped so as to fall into the feed aperture with the open end of the cartridge case downward.

A further object is to realize a feed hopper having the capability of continuously feeding the casings without it being necessary to apply agitation to the feed hopper.

Further objects and additional advantages of the invention will become apparent from the following drawings and detailed description.

BRIEF DESCRIPTION OF THE DRAWINGS

FIG. 1 is a pictorial view of a cartridge loading machine including the feed hopper for cartridge cases of the invention;

FIG. 2 is a cross sectional view of the feed hopper of FIG. 1;

FIG. 3 is another cross sectional view of the feed hopper which is displaced 90° from the view of FIG. 2.

DESCRIPTION OF THE PREFERRED EMBODIMENT AND BEST MODE OF PRACTICE

Referring to FIG. 1 of the drawings numeral 10 designates a cartridge loading machine which is essentially of the same type of construction as that of U.S. Pat. No. 4,020,737, which is incorporated herein by reference. The loading machine has a lower part 12, which is the form shown, is cylindrical having a circular base 14. Overlying the base is a platform 16 just beneath which a cartridge shift plate to which can be imparted quadrilateral movement by way of shift knob 20.

Numeral 26 designates an operating head carrying dies by which the operations necessary to effect the reloading are progressively carried out.

Numerals 32 and 32′ designate a pair of upright columns upstanding from the base of the machine and extending through the head 26 which guide the up and down movement of the head.

Number 34 designates a manual operating handle for operating the machine. It includes a transverse handle part 36. Attached to one end of the handle is a lever member 40 having a C shaped lower part 42. An intermediate part of the lever 40 as shown at 44 is attached to the head 26 by way of a pivot member 46. The lower end of the part 42 as designated at 50 is pivotally mounted about a transverse axis which extends through the base of the machine. Provided on the other side of the machine and attached to the other end of the handle member 36 is a similar lever member 40′ having a lower end part or member 50′ which is pivotally mounted like the lower end of the lever member 40 about a transverse axis through the base of the machine.

Numeral 56 designates a power feed hopper in the shape of a powder horn.

Numeral 58 is the feed tube whereby new primers are fed to the machine.

The feed hopper for cartridge cases is designated by the numeral 60. It preferably may be made of plastic and preferably has a hemispherical shape as shown. At its bottom part it has an extending nipple 62 aligned with the central axis of the hopper. As may be seen at FIGS. 2 and 3 the nipple 62 has a bore 64 and a tapered counter bore 66 which forms a feed aperture at the bottom of the hopper.

As may be seen the side walls of the hopper have a curved configuration of contour extending to the aperture formed by the tapered counter bore 66. As stated, in the preferred form of the invention the hopper is constructed as a hemisphere. At the upper edges of the hopper there is an extending flange 70. Extending into the bore 64 is the upper end of the feed tube 72 through which the cartridge cases are fed to the loading machine.

Numeral 74 designates a bar extending transversely across the hopper in a position over the aperture formed by the tapered counter bore 66. The bar 74 has end parts of smaller diameter as shown at 75 and 76 which are inserted through apertures in the side walls of the hopper 60. Normally the empty cartridges are simply dropped into the hopper 60. The purpose of the bar 74 is to prevent a cartridge from being dropped into the hopper in such a way that it could fall into the tapered counter bore 66 with its open end down.

From the foregoing the manner of utilization and operation of the invention will be readily apparent to those skilled in the art. The machine as a whole is utilized and operated as described in U.S. Pat. No. 4,020,737. The cartridge cases are dropped into the hopper 60, and they gravitate downwardly along the inner surfaces of the curved side walls to the aperture 66. As explained, the center of gravity of the cartridges as they proceed to, and fall into the tapered opening 66 the heavier end, that is, the end with the rim will drop first into the entrance to the feed tube. It has been found that with the shape and configuration of the hopper as shown it will have the capability of regularly feeding the cartridge casings in the desired manner with the rim end down as shown. As explained the bar 74 prevents casings from being dropped directly into the feed opening with the open end down.

A machanical agitation device is not necessary with the hopper as described herein. The casings will feed steadily through the feed tybe 72. Nevertheless if desired a slight shake or twisting motion can be applied to the hopper 60, the tube 72 providing sufficient flexibility for this purpose.

Normally the machine is used with the feed hopper 60 substantially at eye level of the operator. Preferably the hopper is made of transparent plastic material so the operator can view the casings in the hopper and their feeding into the feed tube 72.

The foregoing disclosure is representative of a preferred form of the invention and is to be interpreted in an illustrative rather than a limiting sense, the invention to be accorded the full scope of the claims appended hereto.

I claim:

1. As an article of manufacture, a feed hopper for cartridge cases for use with a cartridge loading machine, in combination, a feed tube having a bore for directing shell casings with the end rim downward to the loading machine, a hopper at the upper end of the feed tube, the hopper having an opening at the bottom aligned with the said feed tube to receive cartridge casings which have a center of gravity closer to the rim end of the casing than to the open end, there being a tapered counterbore between said feed bore and said opening, said tapered counterbore being of substantial length relative to the length of a cartridge and said opening being substantially larger than said bore, the hopper having an open top to receive cartridge casings, the hopper having a smoothly curved, hemispherical, interior contour extending from the top to the perimeter all the way to the said opening whereby cartridges within the hopper moving downwardly towards the opening orient themselves and drop into the opening with the open end up in the said tube.

2. An article as in claim 1, including a rigid member positioned to extend diametrically across the hopper within it in a position overlying the said opening whereby to prevent cartridges being dropped in the hopper directly over said opening that it might drop into the opening with its open end down.

3. An article as in claim 1, in combination with a cartridge loading machine said feed hopper feeding being mounted relative to the loading machine so as to be substandially at eye level.

4. An article as in claim 2, wherein the feed hopper is made of a transparent material so that an operator can see the cartridges within the hopper.

5. An article as in claim 1, wherein the feed tube is flexible so that the feed hopper can be manually agitated to cause the cartridge to move downwardly.

6. An article as in claim 1 wherein the said feed hopper has an axially extending nipple head at the bottom, the said feed tube fitting into the nipple, the nipple having a bore to receive the feed tube, the said counterbore being formed in the nipple and extending from the said bore in the nipple to the opening at the bottom of the hopper.

* * * * *